United States Patent [19]
Kohno et al.

[11] 3,915,933
[45] Oct. 28, 1975

[54] SHRINKABLE FILMS

[75] Inventors: Mitsuo Kohno; Takashi Ogata, both of Moriyama; Minoru Nomura, Yokohama, all of Japan

[73] Assignee: Asahi Kasei Kogyo Kabushiki Kaisha, Osaka, Japan

[22] Filed: Oct. 4, 1973

[21] Appl. No.: 403,487

[30] Foreign Application Priority Data
Oct. 6, 1972  Japan.................. 47-99910

[52] U.S. Cl............. 260/47 C; 264/210 R; 264/288; 264/289; 264/290 R; 264/290 T; 428/910
[51] Int. Cl.².......................................... B29D 7/24
[58] Field of Search............ 161/402, 231; 264/288, 264/289, 290 R, 290 T, 210 R; 260/47 C, 75 R

[56] References Cited
UNITED STATES PATENTS

| | | | |
|---|---|---|---|
| 2,784,456 | 3/1957 | Grabenstein | 264/288 |
| 3,261,903 | 7/1966 | Carr | 264/288 |
| 3,361,861 | 1/1968 | Bertinotti | 264/288 |
| 3,595,736 | 7/1971 | Buteux | 161/402 |
| 3,627,579 | 12/1971 | Heffelfing | 264/210 |
| 3,800,022 | 3/1974 | Buteux | 264/288 |

*Primary Examiner*—George F. Lesmes
*Assistant Examiner*—Ellis P. Robinson
*Attorney, Agent, or Firm*—Armstrong, Nikaido & Wegner

[57] ABSTRACT

Uniaxially stretched films comprising essentially polyethylene-1,2-diphenoxyethane-4,4'-dicarboxylate which show shrinkage on heating in greater amount in the direction transversal (i.e. perpendicular) to the stretching direction than in the stretching direction can be obtained by a specified condition but with the restriction of the neck-in within 30%.

5 Claims, 4 Drawing Figures

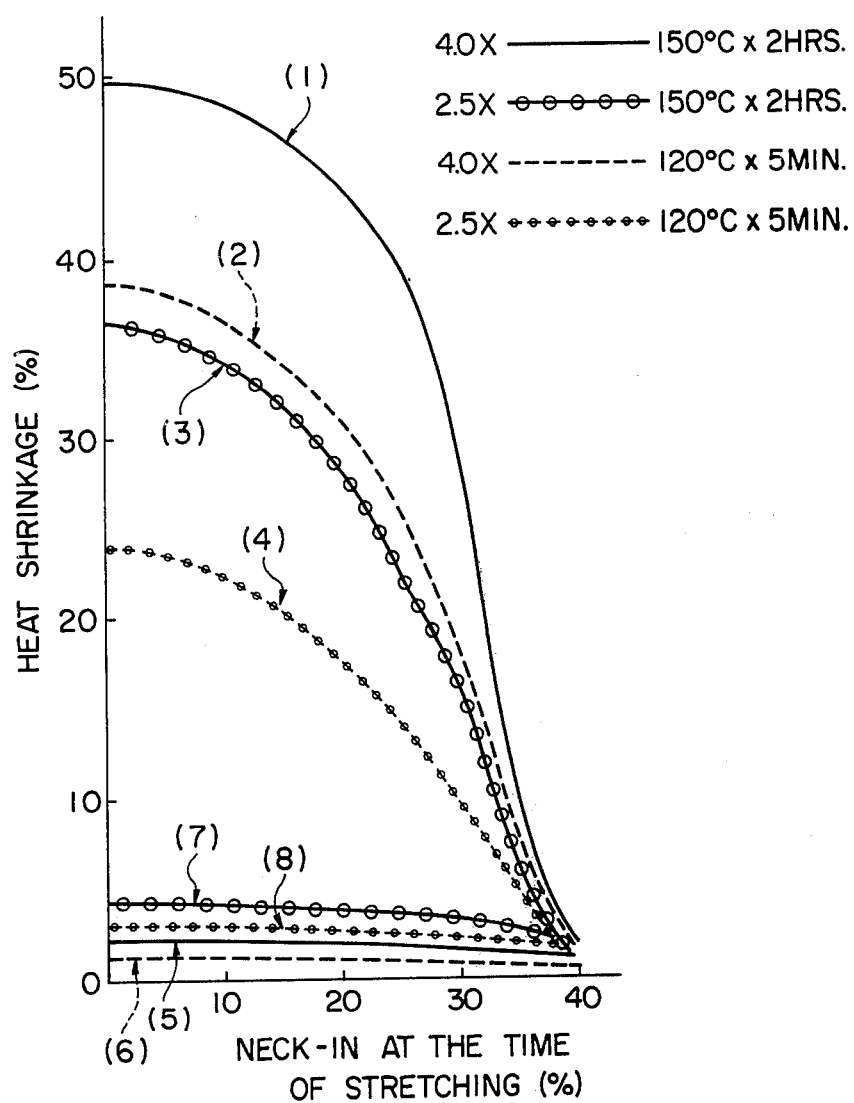

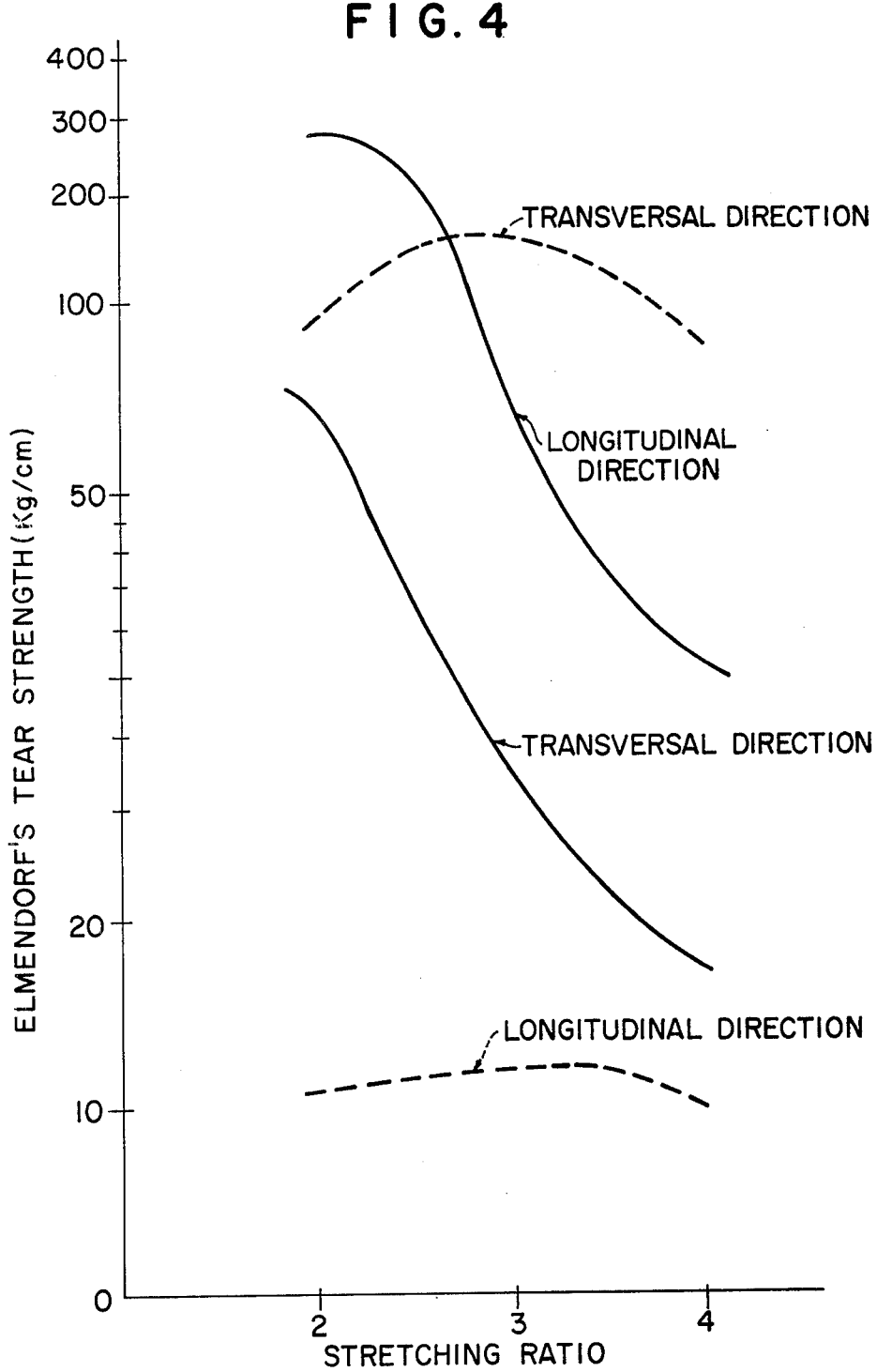

SHRINKABLE FILMS

DESCRIPTION OF THE INVENTION

This invention relates to polyethylene-1,2-diphenoxyethane-4,4'-dicarboxylate films or tubes.

Heretofore, films or tubes prepared from various kinds of thermoplastic resins have been utilized as packaging or coating materials for various kinds of articles. Particularly for packaging or coating of relatively longer articles, e.g. electric wire, rod articles, foodstuffs such as sausage among them, films or tubes having shrinkability only in one direction i.e. only in the direction of shorter dimension of said articles have been used in the above-mentioned application fields by using a so-called shrink packaging technique, because they give economical and effective packaging. The films and tubes for such purposes have been prepared by uniaxial stretching, and without subjecting to heat-setting procedure in order to utilize general characteristic properties of high molecular weight materials. However, their characteristic properties of unidirectional shrinkability have been not only insufficient, but also their heat stability, resistances to splitting, to gas permeability, etc. have not been satisfactory and hence their utilization fields have been relatively limitative.

It is, accordingly, an object of the present invention is to provide films or tubes having a large shrinkability only in one direction.

It is another object of the present invention to provide films or tubes superior in resistances to heat and to gas permeability, electric insulating property, dielectric properties, resistance to splitting, mechanical strength, transparency, etc. in addition to the above-mentioned properties.

It is a further object of the present invention to provide a process for producing the above-mentioned films or tubes with a higher production yield and inexpensively.

In order to find out a method for producing polyester films which are shrinkable to a large extent only in one direction and moreover superior in resistance to heat, electric insulation, resistance to gas permeability, resistance to splitting, etc. through a relatively simple apparatus and operation, i.e. polyester films in which the above-mentioned drawbacks of conventional films having shrinkability only in one direction have been overcome, we have been working earnestly and as the result of this work, we have found that uniaxially stretched films which have much more shrinkability in the direction transversal to the stretching direction than in the stretching direction can be prepared by using polyethylene-1,2-diphenoxyethane-4,4'-dicarboxylate. Such shrinkability has never been known in case of conventional polyesters, e.g. uniaxially stretched polyethylene terephthalate film shows much more shrinkability in the stretching direction than in the transversal direction to the stretching direction, and thus we have completed the present invention.

According to the specification of British Pat. No. 1,136,133, there is disclosed that when polyethylene-1,2-diphenoxyethane-4,4'-dicarboxylate film whose amorphous layer has been crystallized by heating, is uniaxially stretched in the direction of extrusion (which direction will be hereinafter referred to as stretching direction), films having superior mechanical properties in the stretching direction whose heat shrinkage is so low as not more than 1% per 1 minute at 200°C in that direction and moreover which are hardly fibrillated even on heating, can be obtained. In this case there is no particular description about the necessity of heat setting after stretching, but there is description as to turning the above-mentioned amorphous film into crystalline state at 85°–125°C before stretching, particularly at such a temperature as high as 150°–220°C when the prevention of fibrillation of film is taken into consideration. In order to obtain product films having such a remarkably small heat shrinkage as above-mentioned in the stretching direction (longitudinal direction), it is considered from a common sense of art that heat setting is necessary when such crystallization temperature is low. In fact, we have found as a result of study of the prior art that crystallization step either before or after stretching is at any rate necessary in order to produce films stretched in the stretching direction which do not show fibrillation and whose heat shrinkage in the stretching direction is kept not more than 1% per minute at 200°C, and what is more important here, the shrinkability of films in the direction perpendicular to the stretching direction (i.e. in the transversal direction, here) which is obtained according to the method of the prior art is at the highest about 5% per minute at 200°C though not described in the above-mentioned patent literature and thus such a film can not be placed in the class of shrinkable film.

We have discovered that sheet-form or tubular articles which show extremely small heat shrinkage in the stretching direction but extremely large heat shrinkage in the transversal direction can be obtained only by subjecting sheet-form or tubular articles having a thickness of 3–500 $\mu$, preferably 3–250 $\mu$, and consisting of substantially amorphous polyethylene-1,2-diphenoxyethane-4,4'-dicarboxylate under specified conditions to uniaxial stretching. This is quite a useful characteristic property which is quite unexpectable from the above-mentioned prior art. Thus, according to the present invention, it is possible to provide flat films or tubular films superior in resistance to heat, resistance to gas permeability, electric insulation, dielectric properties, resistance to splitting, mechanical strength, transparency, etc., by the stretching operation which makes the most of the characteristic properties of the above-mentioned polyesterether. Among such properties, what are particularly different from those of conventional films, are, in addition to the notable heat shrinkage in the transversal direction, a great resistance to splitting in the stretching direction as shown in FIG. 4. This is also a characteristic property which is quite contrary to the common sense of general films. Further, resistance to splitting in the transversal direction is also of such an extent that it is sufficient in practical use. Accordingly, the flat films or tubular films of the present invention have properties essentially superior to those of polyethylene terephthalate. This characteristic property is somewhat reduced after the films of the present invention are subjected to heat shrinkage in actual use but the films still have tear strength quite sufficient for practical purpose.

The most suitable process for producing the films of the present invention will be described hereinafter. A substantially amorphous polyethylene-1,2-diphenoxyethane-4,4'-dicarboxylate film having a suitable thickness is stretched unidirectionally to two to five times the original length at a temperature in the range of 55° to 100°C, preferably at a temperature of 85°C or lower, without breaking said film to give molecular orientation. Stretching less than two times stretching does not give the shrinkable film of the present invention, while stretching greater than five times is liable to bring about breakage of film. In this case, general plastic films have a tendency of decreasing their length in the transversal direction i.e. width, when a tension is applied in the stretching direction. However, for producing the films of the present invention, stretching is carried out by controlling the rate of decrease of length in the transversal direction (this will be hereinafter referred to as "neck-in") to 30% or less, preferably to 15% or less, more preferably to substantially zero %. Of course, the step of crystallization (heat setting) before or after stretching must not be used here. As for the stretching direction in case of tubular films, only the direction of extrusion i.e. longitudinal direction is the stretching direction and hence the tubular films of the present invention show a large shrinkability only in the radial direction i.e. in the direction for narrowing the diameter, and in case of flat films, stretching is possible both in the extrusion direction (longitudinal direction) and the direction perpendicular to the extrusion direction (transversal direction) and hence two kinds of films having opposite shrinkage direction can be obtained.

In case of tubular films, the control of neckin is easy by adjusting the amount of air blown in the inside of the tubular films or the like. In case of flat films, when continuous production is carried out by using a tenter, neck-in becomes practically zero in the transversal stretching due to substantially complete restriction in the perpendicular direction, and most typical, unidirectionally shrinkable, uniaxially stretched films can be easily obtained. In case of the longitudinally uniaxial stretching of flat films, neck-in can be controlled by adjusting the distance of free pass line between lower speed rollers and higher speed rollers in order to effect the restriction in the direction of width. More concretely, if the width of unstretched film (raw film) is in the range of 500 mm to 700 mm, stretching is carried out by adjusting the neck-in to 20% or less; if the width of unstretched film is in the range of 700 mm to 1000 mm, it is carried out by adjusting the neck-in to 25% or less; and if the width of unstretched film is larger than 1000 mm, it is carried out by adjusting the neck-in to 30% or less. The reason of the above-mentioned control of neck-in in the longitudinally uniaxial stretching lies in that when unstretched films having a broader width are used, the influence of neck-in itself on the central part of the films is lessened thereby. Even in case of films having a width less than 500 mm, they are set so as to lessen the influence on the central part.

The characteristic properties of these films in case of longitudinally uniaxial stretching and in case of transversally uniaxial stretching will be compared hereunder.

In case of longitudinally uniaxial stretching, there are advantages in the points of easiness in the increase of production rate, simplicity of apparatus and inexpensive cost, but such drawbacks as longitudinally streaked marks on film surfaces seemingly due to slight defect of dies or sticking of degraded products or the like at the time when polymers are extruded from the dies, or unevenness of thickness in the width direction, etc. are brought into products, as they were, almost without any improvement. Whereas, in case of transversally uniaxial stretching by way of tenters, these die marks and unevenness of thickness are almost completely improved, neck-in is zero and there is an advantage not only in unidirectionality of shrinkage exhibited to the greatest extent but also in the complete uniformity of molecular orientation of polymer in the transversal direction. This advantage of uniformity of orientation means that films having completely same physical properties in the direction of width can be obtained. This is a superior point compared with the longitudinally stretched films both the ends of which always show some extent of warping of orientation due to neck-in. However, a tenter apparatus has limitation in increasing production rate (increase of speed). In general, transversal stretching has disadvantage in that it is more expensive than longitudinal stretching. At any rate, it is possible to select stretching direction according to the direction of shrinkage required for products.

Polyethylene-1,2-diphenoxyethane-4,4'-dicarboxylate is a polymer obtained by the condensation reaction of ethylene glycol with 1,2-bis (p-carboxyphenoxy) ethane or by the ester interchange reaction of the former with a lower alkyl ester of the latter followed by polycondensation.

Some modifications of polymers by the addition of less than 10% (in total) of one or more kinds of comonomer as a third component, e.g. terephthalic acid, isophthalic acid, phthalic acid, adipic acid, sebacic acid, naphthalene-2,6-dicarboxylic acid, etc. as dicarboxylic acid, propylene glycol, 1,4-butane diol, diethylene glycol, triethylene glycol as glycol are included in the scope of the films of the present invention so long as they are substantially not harmful to the unidirectionally shrinkable property. It does not matter even when various kinds of additives e.g. plasticizers, slip-improver, nucleating agent for crystallization, pigment, light stabilizer, antistatic agent, etc. can be incorporated.

It is preferable to use a polymer having a molecular weight corresponding to an intrinsic viscosity $[\eta]$ of 0.5 to 1.3, preferably 0.6–1.0, as measured in 1% solution in o-chlorophenol at 35°C. Increase of polymerization degree of polymer is not preferable because it increases the cost of the polymer, but too much reduction of polymerization degree deteriorates the capability of uniform forming of unstretched films at the time of film-making, but variation of unidirectional shrinkability depending upon the polymerization degree is particularly small.

The temperature necessary for heat-shrinking the films of the present invention is in the range from 80°C to m.p. For example, when the films of the present invention are exposed to a temperature in the range of 120°–150°C for more than 10 seconds to about 10 minutes, an equilibrium state at said temperature is almost attained. Namely, the heat shrinkage of the film of the present invention exhibited when it is heated at a temperature in the above-mentioned temperature range, although it may vary to some extent depending upon stretching conditions, is 10% to substantially zero, preferably 5% to 0.5%, of the original length in the stretching direction when heated at 150°C for 2 hours. However, the shrinkability of the film in the transversal direction is 15 to 50%, preferably 20 to 50%, of the original length, when heated at 150°C for 2 hours. The tensile strength of the film in the stretching direction is 15 to 45 kg/mm², preferably 18 to 30 kg/mm², and that in the transversal direction is 5 to 15 kg/mm², preferably 5 to 10 kg/cm². The tear strength of the film in the stretching direction is 300 to 500 kg/cm, preferably 300 to 400 kg/cm and that in the transversal direction is 30 to 100 kg/cm, preferably 50 to 80 kg/cm.

The characteristic properties of the films of the present invention in connection with the production process will be described by referring to the drawings.

FIG. 3 is a chart showing the relationship between the neck-in at the time of longitudinal stretching of the tube of the present invention and the heat shrinkage of products, wherein solid lines and dotted lines show four times stretching and stringed beads lines and arranged beads lines show 2.5 times stretching.

FIG. 4 is a chart showing the relationship between stretching ratio of the tube of the present invention and tear strength of product (by means of Elmendorf's tearing tester according to JIS-P-8116) wherein broken lines show the case of polyethylene terephthalate.

Figure 1:
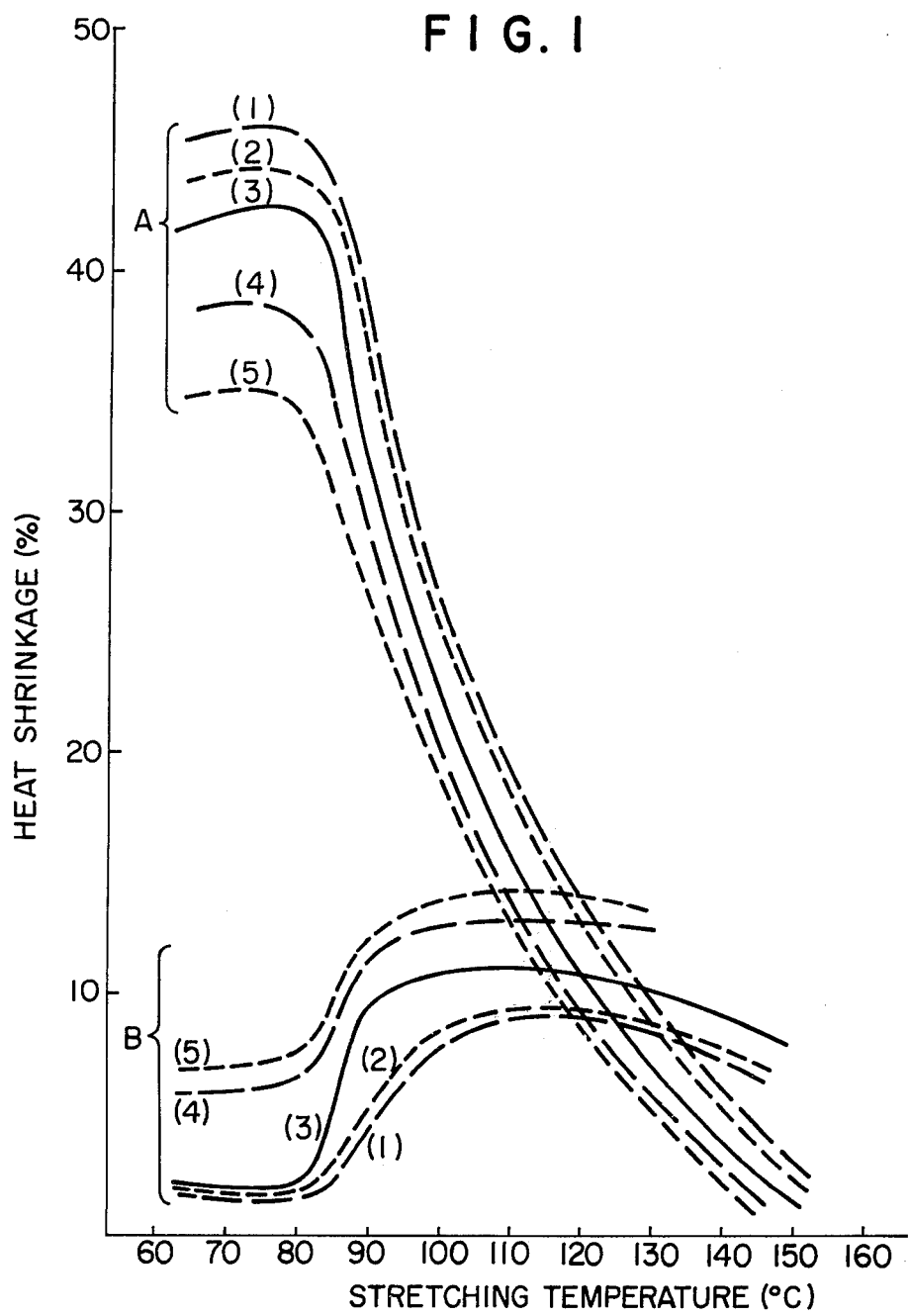
FIG. 1 is a chart in which heat shrinkages in the stretching and transversal directions of the film stretched in the transversal direction as measured after heating in air at 150°C for 2 hours, are plotted against stretching temperatures.

At first, FIG. 1 relates to a transversally uniaxially stretched film showing the relationship between heat shrinkage of product films and stretching conditions such as stretching temperature, stretching ratio and stretching speed. There are plotted here the heat shrinkages of the films obtained by stretching a substantially amorphous film of 90 μ thick, continuously in the transversal direction by means of tenter (as measured by the change of dimension in air under conditions of 150°C for 2 hours), vs. stretching temperature.

Group A shows the heat shrinkage in the stretching direction and B shows the heat shrinkage in the transversal direction. The conditions for stretching ratio and stretching speed as two parameters used in this chart are as follows:

| Number | Stretching ratio (times) | Stretching speed (%/minute) |
| --- | --- | --- |
| 1 | 3.5 | 2800 |
| 2 | 3.5 | 1050 |
| 3 | 3.0 | 700 |
| 4 | 2.5 | 2800 |
| 5 | 2.5 | 1050 |

In the chart, it is seen that the heat shrinkages in the longitudinal direction (direction perpendicular to stretching direction) and transversal direction (stretching direction) are influenced greatly by the stretching temperature, and with the increase of temperature, their difference is gradually diminished; at a certain temperature, both the values become identical; and at a higher temperature, inversion occurs. For example, when stretching is carried out in the transversal direction to three times at a stretching velocity of 700%/minute as in shown by 3 of FIG. 1, the heat shrinkage in the transversal direction in case of the stretching temperature of 60°–80°C is 2.5% or less but the heat shrinkage in the longitudinal direction is 40% or more. It is clear that superior selectively directional shrinkability is indicated. Though not shown in the chart, even in the heat shrinkage under conditions of 120°C for 5 minutes, superior selectively directional shrinkability was indicated, namely it is 1% or less in the transversal direction and 30% or more in the longitudinal direction. When stretching temperature is increased further, transversal shrinkage increases with steep slopes up to 90°C, then with gentle slopes, and becomes greater than longitudinal shrinkage at 120°C or higher. This temperature at which shrinkages are reversed varies slightly depending upon stretching ratio, stretching speed, etc., but it is mostly put in the range of 100°–130°C.

As mentioned above, in order to produce films having notable unidirectional shrinkability, it is preferable to effect stretching at a low temperature, but stretching at a temperature of 55°C or lower is, on the other hand, not preferable from the difficulty of the stabilized production of films having superior appearance and transparency with a stretching velocity i.e. production velocity acceptable from economical viewpoint.

If the effect of stretching ratio and stretching velocity in the transversally uniaxial stretching is investigated from FIG. 1, it is seen that the greater the stretching velocity and the greater the stretching ratio, the greater the unidirectional shrinkability, i.e. the directional selectivity of shrinkage.

Figure 2:
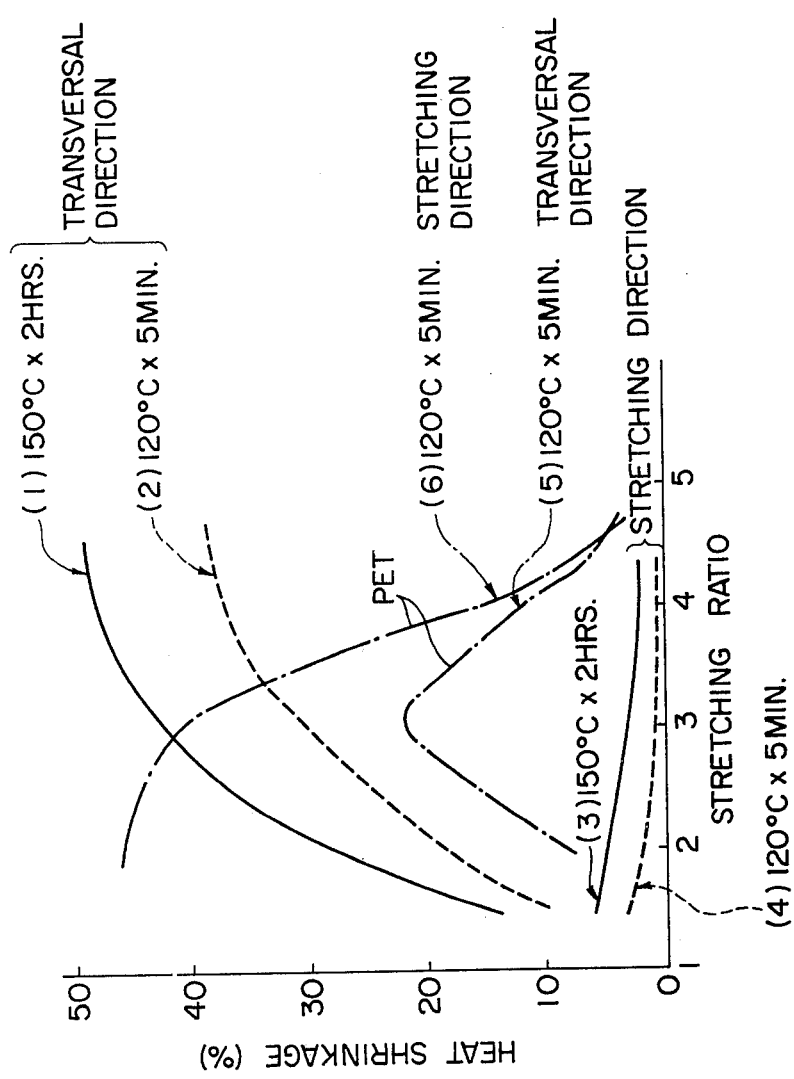
FIG. 2 is a chart showing the relationship between heat shrinkage and stretching ratio, wherein solid lines and dotted lines show the case of tubular film of the present invention and chain lines show the case of polyethylene terephthalate.

Next, by picking up only stretching ratio, the comparison of longitudinal stretching is made between the tube of the present invention and that of polyethylene terephthalate and shown in FIG. 2 by solid lines and dotted lines, respectively.

In this chart the conditions of each runs are as follows:

1. transversal direction (150°C, 2 hours)
2. transversal direction (120°C, 5 minutes)
3. stretching direction (150°C, 2 hours)
4. stretching direction (120°C, 5 minutes)
5. transversal direction (120°C, 5 minutes) (PET)
6. stretching direction (120°C, 5 minutes) (PET)

Stretching was carried out at 80°C in both the cases. Neck-in was kept at substantially zero by the control of the pressure blown in the tubular films.

There are indicated relationships between heat shrinkages of product films (as measured at 150°C for 2 hours and at 120°C for 5 minutes in case of the tubular films of the present invention and at 120°C, 5 minutes in case of polyethylene terephthalate) and stretching ratios in the stretching direction, but the same tendency as in FIG. 1 can be observed. From these runs also, it is seen that stretching ratio of two times or more, preferably 2.5 times or more is necessary in order to obtain films having notable unidirectional shrinkability. Further it is seen that the relation between stretched direction and direction of greater shrinkage in case of the film of the present invention is diametrically opposite to the same relation in case of the film of polyethylene terephthalate, and moreover the non-uniformity of shrinkage vs. direction of the film of the present invention is greater.

FIG. 3 shows the heat shrinkage (120°C for 5 minutes and 150°C for 2 hours) which occurs when neck-ins at the time of longitudinal stretching of tube are varied in the range of 0–40%. Data are obtained in case of 2.5 times and four times stretching at a temperature of 80°C. Conditions are as follows:

1. 4.0 times transversal direction (150°C, 2 hours)
3. 2.5 times transversal direction (150°C 2 hours)
2. 4.0 times transversal direction (120°C, 5 minutes)
4. 2.5 times transversal direction (120°C, 5 minutes)
5. 4.0 times stretching direction (150°C, 2 hours) 7.
2.5 times stretching direction (150°C, 2 hours)
6. 4.0 times stretching direction (120°C, 5 minutes)
8. 2.5 times stretching direction (120°C, 5 minutes)

Unless neck-in at the time of longitudinal stretching is maintained at a value of 30% or less, preferably 15% or less, it is indicated that the effect of dimentional non-uniformity of shrinkage is not increased.

Further, processes for producing the films of the present invention will be described in detail.

It is preferable that the flat films or tubular films of the present invention are produced by extrusion from a slit or circuiar die. Extrusion can be carried out at a temperature in the range of 270°–310°C. After extrusion, flat films or tubular films must be quenched to a temperature of 80°C or lower, preferably 60°C or lower, preferably, above room temperature, to produce substantially amorphous polymer films having a density of 1.315 to 1.303, preferably 1.310 or less. If crystallization is advanced here at this time, the uniformity of stretching at the time of uniaxial stretching becomes poor, and unevenness of thickness becomes remarkable. In addition, shrinkability cannot be imparted to products of flat films or tubular films.

Then, step of stretching will be described. In case of flat film, for uniaxial stretching in the stretching direction (extruding direction), a method in which stretching is carried out between common well known two sets or more of high speed and low speed rolls is most popular. In this case, by way of narrowing of gap of rolls or fixing of stretching point within a narrow range or other as above-mentioned, neck-in is varied according to raw material non-stretched film, but maintained always at 30% or less. For stretching in the transversal direction, a method in which the above-mentioned tenter apparatus is used to carry out stretching continuously while gripping both the edges of layers is preferable.

In case of tube, a method in which air or other fluid is filled in the inside of the tube between high speed nip rolls and low speed nip rolls to control the neck-in, is most common. However, in every case, it is preferable to preheat amorphous layer at a temperature 5°–10°C lower than stretching temperature, preferably at a temperature of 70°C or lower. The crystallization of said layer must not be advanced during the preheating time. From the same viewpoint, heat-setting after stretching must not be added in the process for producing films according to the present invention because it increases the crystallization degree of films and reduces heat shrinkage.

In order to describe the nature of the present invention more fully, the following examples are offered relating to the process for producing the films of the present invention, but it is by no means intended to limit the scope of the invention.

The values of the tensile strengths in Examples were measured according to JIS-C-2318-1966 and those of the tear strengths were measured according to JIS-C-8116.

In the following Examples, the thickness of stretched film was reduced correspondingly to the stretching ratio, e.g. when stretching ratio is two times, the thickness of stretched film is ½ of the original thickness.

EXAMPLE 1

Polyethylene-1,2-diphenoxyethane-4,4'-dicarboxylate having an intrinsic viscosity of 0.70 as measured in o-chlorophenol (1% solution) at 35°C was extruded at 280°C to make a film having a thickness of 0.09 mm, followed by quenching to 60°C. The resulting film having a density of 1.306 as measured was stretched to three times the original width in the transversal direction by means of a tenter, at a stretching velocity of 700%/min, at each temperature of 60°C, 70°C and 80°C. In each case, the neck-in was substantially zero. The physical properties of the films thus obtained are shown in the following Table 1:

Table 1

| Stretching temperature (°C) | Tensile strength (Kg/mm²) | | Heat shrinkage (%) (150°C, 2 hrs.) | |
|---|---|---|---|---|
| | Stretched lateral direction (stretching direction) | longitudinal direction (direction perpendicular to stretching direction) | Stretched lateral direction (stretching direction) | longitudinal direction (direction perpendicular to stretching direction) |
| 60 | 25 | 5.8 | 2.5 | 42 |
| 70 | 25 | 8.2 | 2.3 | 43 |
| 80 | 23 | 8.0 | 2.2 | 43 |

| Stretching temperature (°C) | Heat shrinkage (%) (120°C, 5 min.) | | Tear strength (Kg/cm) | |
|---|---|---|---|---|
| | Stretched lateral direction (stretching direction) | longitudinal direction (direction perpendicular to stretching direction) | Stretched lateral direction (stretching direction) | longitudinal direction (direction perpendicular to stretching direction |
| 60 | 1.2 | 31 | 330 | 50 |
| 70 | 1.1 | 33 | 370 | 43 |
| 80 | 1.1 | 33 | 500 | 33 |

EXAMPLE 2

A 0.09 mm thick film prepared by using the same raw material and manner as in Example 1, was stretched in stretching ratios of 1.5 times, 2.0 times, 2.5 times and 3.5 times the original width, respectively, in the lateral direction, by means of a tenter, at a stretching velocity of 700%/min. and at a stretching temperature of 80°C. In each case, the neck-in was substantially zero. The physical properties of the films thus obtained are shown in the following Table 2:

Table 2

| Stretching ratio | Tensile strength (Kg/mm²) | | Heat shrinkage (%) (150°C, 2 hrs.) | |
|---|---|---|---|---|
| | lateral direction (stretching direction) | longitudinal direction (direction perpendicular to stretching direction) | lateral direction (stretching direction) | longitudinal direction (direction perpendicular to stretching direction) |
| 1.5 | 11 | 9.7 | 5.1 | 14 |
| 2.0 | 16 | 9.4 | 4.8 | 28 |
| 2.5 | 19 | 8.1 | 3.9 | 36 |
| 3.5 | 29 | 5.5 | 1.2 | 46 |

| Stretching ratio | Heat shrinkage (%) (120°C, 5 min.) | | Tear strength (Kg/cm) | |
|---|---|---|---|---|
| | lateral direction (stretching direction) | longitudinal direction (direction perpendicular to stretching direction) | lateral direction (stretching direction) | longitudinal direction (direction perpendicular to stretching direction) |
| 1.5 | 2.5 | 10 | 380 | 70 |
| 2.0 | 2.0 | 19 | 350 | 67 |
| 2.5 | 1.7 | 24 | 470 | 55 |
| 3.5 | 0.6 | 35 | 410 | 51 |

COMPARATIVE EXAMPLE 1

Polyethylene terephthalate having an intrinsic viscosity of 0.70 as measured in the same manner as in Example 1, was made into a 0.09 mm thick film in the same manner as in Example 1. The resulting film was stretched to 3.5 times the original width in the lateral direction, at a stretching velocity of 700%/min and at a stretching temperature of 85°C. In this case, neck-in was substantially zero. The physical properties of the film thus obtained are shown in the following Table 3:

Table 3

| Tensile strength (Kg/mm²) | | Heat shrinkage (%) (150°C, 2 hrs.) | |
|---|---|---|---|
| lateral direction (stretching direction) | longitudinal direction (direction perpendicular to stretching direction) | lateral direction (stretching direction) | longitudinal direction (direction perpendicular to stretching direction) |
| 27 | 6.4 | 20 | 16 |

| Heat shrinkage (%) (120°C, 5 min.) | | Tear strength (Kg/cm) | |
|---|---|---|---|
| lateral direction (stretching direction) | longitudinal direction (direction perpendicular to stretching direction) | lateral direction (stretching direction) | longitudinal direction (direction perpendicular to stretching direction) |
| 13 | 8.5 | 38 | 230 |

The heat shrinkages shown above are all those brought about by heating at 150°C for 2 hours and at 120°C for 5 minutes. The tear strengths were measured by means of Elmendorf's tear tester according to JIS-P-8116 (JIS: Japanese Industrial Standards).

It is seen from Examples 1 and 2 that the laterally stretched films of polyethylene-1,2-diphenoxyethane-4,4'-dicarboxylate exhibit an extremely large heat shrinkage in the longitudinal direction (direction perpendicular to stretching direction), whereas the heat shrinkage in the transversal direction (stretching direction) is extremely small. Particularly, the films stretched to 2.5 times or more the original width in the transversal direction, exhibit such a remarkable directionally nonuniform shrinkability that the heat shrinkage in the transversal direction is 4% or less, whereas that in the longitudinal direction is 30% or more, when heated at 150°C for 2 hours, in the cases of both directions. The significance of this fact will be more clarified when compared with Comparative Example 1. Namely, as for the heat shrinkages of polyethylene terephthalate film prepared under the corresponding stretching conditions, the difference between the heat shrinkages in the longitudinal direction and in the transversal direction is smaller than those of the films of the present invention.

EXAMPLE 3

Polyethylene-1,2-diphenoxyethane-4,4'-dicarboxylate having an intrinsic viscosity of 0.88 as measured in o-chlorophenol (1% solution) at 35°C, was extruded from a circular die of an extruder at an extrusion temperature of 295°C and quenched to 40°C within 1 second by firmly contacting the extrudate onto a water-cooled metallic mandrel for cooling to obtain a substantially amorphous tubular film having a density of 1.309, a diameter of 100 mm and a thickness of about 0.15 mm, which was then once folded, and taken up and wound into a roll form. The resulting tubular film was supplied between feeding nip rolls revolving at a lower velocity and take-up nip rolls revolving at a higher velocity, while the film were adjusted to give almost the same diameter before and after stretching by introducing air under pressure into the inside of the tubular film. The film was uniaxially stretched in the stretching direction, at a stretching temperature of about 80°C, while varying stretching ratio to various values by adjusting the revolving velocities of the nip rolls, and at a stretching velocity in the range of 2000% to 8000%/min, followed by immediate quenching to 40°C or lower and by taking up. In this case, neck-in was also substantially zero. Several kinds of the uniaxially stretched tubular films thus obtained were cut to a proper length, respectively, allowed to stand for 5 minutes in an oil bath at 120°C, and taken out. The heat shrinkages of the resulting samples in the stretching direction and in the transversal direction (diameters of the tubes) were measured. Further, the heat shrinkages caused through heating at 150°C for 2 hours were also measured. The results are shown in FIG. 2, where the chain lines show heat shrinkages of polyethylene terephthalate treated at 120°C, for 5 minutes.

EXAMPLE 4

Stretching was carried out by using the same amorphous tubular film and the same apparatus as in Example 3, and adjusted so as to give a stretching ratio of 2.5 times or four times, by varying the amounts of air introduced into the inside of the tubular film to obtain several kinds of longitudinally uniaxially stretched tubes having different neck-ins. The heat shrinkages of the tubes thus obtained were measured according to the same manner as in Example 3. The results are shown in FIG. 3.

EXAMPLE 5

Polyethylene-1,2-diphenoxyethane-4,4'-dicarboxylate having an intrinsic viscosity of 0.96 as measured in o-chlorophenol at 35°C, was extruded from T-die provided on an extruder, at an extrusion temperature of 310°C, and cooled by closely contacting the extrudate onto a casting roll, to give a substantially amorphous film having a thickness of about 0.08 mm, a width of 420 mm and a density of 1.308. The resulting film was stretched to 3.5 times the original length, at 80°C, at a velocity of 40000%/min, by means of a roll stretching machine. The diameters of the stretching rolls were 150 mm, and the distance between lower velocity rolls and higher velocity rolls was set to so close as 3 mm.

The film thus obtained had a neck-in of about 12% along the total width, as compared with the film prior to stretching. The heat shrinkages of the resulting film heated at 150°C, for 2 hours were 1.5% in the stretching direction and 39% in the transversal direction. Further, at the heating at 120°C, for 5 minutes, the heat shrinkages were 0.9% in the stretching direction and 29% in the lateral direction. The tensile strength in the stretching direction, of the film was 30 Kg/mm² and that in the transversal direction was 5.4 Kg/mm². The tear strength in the stretching direction, of the film was 400 Kg/cm and that in the transversal direction was 50 Kg/cm².

EXAMPLE 6

The respective tear-resistant properties of the films obtained in Example 3 were measured according to the same measurement method as in Examples 1 and 2. The results are shown in FIG. 4. It can be seen from this Figure that the flat films or tubular films of the present invention are specific and superior also in mechanical properties. Namely, there is tendency that resistance to splitting in the stretching direction is improved and films become less splittable in the stretching direction than in the transversal direction.

COMPARATIVE EXAMPLE 2

A uniaxially stretched film was prepared by using polyethylene terephthalate having an intrinsic viscosity of 0.8 as measured in o-chlorophenol at 35°C and in the same manner as in Example 3. The heat shrinkages and tear strengths of the film thus obtained were measured, and the results are shown in FIGS. 1 and 4, with dotted lines. These results are in remarkable contrast to the specific feature of the flat films or tubular films of the present invention, and exhibit only the feature of usual uniaxially stretched films.

COMPARATIVE EXAMPLE 3

Substantially amorphous film of polyethylene-1,2-diphenoxyethane-4,4'-dicarboxylate obtained in Example 5 was pretreated and subjected to longitudinally uniaxial stretching under restriction of neck-in to below 30%, by the use of the same apparatus and under the following conditions:

A. heated at 90°C for 25 seconds on a heated roll and then stretched to 3.0 times the original length at 80°C and at a stretching speed of 80000%/min.

B. heated at 180°C, for 30 seconds on a heated roll and then stretched to 3.7 times the original length at 150°C and at a stretching speed of 10000%/min.

Neck-in at the time of stretching and physical properties of the resulting film were as follows:

| | Neck-in (%) | Tensile strength (Kg/mm²) | | Heat shrinkage (%) | | Tear strength (Kg/cm) | |
|---|---|---|---|---|---|---|---|
| | | MD | TD | MD | TD | MD | TD |
| A | 22 | 26 | 5.8 | 0.5 (0.3) | 0.3 (0.2) | 10 | 16 |
| B | 14 | 24 | 6.2 | 0.3 (0.2) | 0.4 (0.2) | 12 | 18 |

Notes: Heat shrinkage: 150°C × 2 hrs.
Figures in the parentheses: 120°C × 5 min.
MD: stretching direction
TD: transversal direction

COMPARATIVE EXAMPLE 4

The physical properties of film prepared by using the substantially amorphous tube obtained in Example 3 and under the conditions of the above-mentioned (A) while controlling the inside pressure to make the neck-in substantially zero, were as follows:

| Tensile strength (Kg/mm²) | | Heat shrinkage (%) | | Tear strength (Kg/cm) | |
|---|---|---|---|---|---|
| MD | TD | MD | TD | MD | TD |
| 25 | 5.6 | 0.5 (0.3) | 0.4 (0.2) | 10 | 15 |

Note:
Heat shrinkage: 150°C, 2 hrs.
Figures in parentheses: 120°C × 5 min.

As shown above in Examples, the flat films or tubular films of the present invention are entirely outside the conception of conventional uniaxially stretched films or tubes. Namely, the heat shrinkages of the flat films or tubular films of the present invention in the stretching direction and in the perpendicular direction thereto are diametrically opposite to those of conventional films or tubes, and their anisotropic(directionally non-uniform) property is extremely large. Further, their tear strength is also great in both the directions; they are hard to be split particularly in the stretching direction, and are also superior in other physical properties such as heat-resistance, resistance to gas-permeability, chemicals-resistance, transparency, electric insulation, dielectric characteristic, etc. Thus, the films or tubes of the present invention are very useful for packagings, coatings, etc. of various goods.

What is claimed is:

1. Uniaxially stretched films consisting essentially of polyethylene-1,2-diphenoxyethane-4,4'-dicarboxylate which show shrinkage on heating at 150°C for 2 hours, 10% to substantially zero, of the original length in the stretching direction and 15 to 50% of the original length in the direction transversal to the stretching direction.

2. Uniaxially stretched films according to claim 1, wherein said films exhibit a tensile strength of 15 to 45 Kg/mm² in the stretching direction and that of 5 to 15 Kg/mm² in the direction transversal to the stretching direction, and a tear strength of 300 to 500 Kg/cm in the stretching direction and that of 30 to 100 Kg/cm in the direction transversal to the stretching direction.

3. Uniaxially stretched films according to claim 1 wherein said films are of flat form.

4. Uniaxially stretched films according to claim 1 wherein said films are of tubular form.

5. A method for producing uniaxially stretched films which show shrinkage on heating in a substantially greater amount in the direction transversal to the stretching direction than in the stretching direction, which comprises stretching in the absence of heatsetting a substantially amorphous polyethylene-1,2-diphenoxyethane-4,4'-dicarboxylate layer uniaxially to about two to five times the original length at a temperature in the range of 55° to 100°C with the restriction of the neck-in to 30% or less.

* * * * *